(12) United States Patent
Gill et al.

(10) Patent No.: US 8,459,700 B2
(45) Date of Patent: Jun. 11, 2013

(54) WET DISCONNECT SYSTEM WITH POST DISCONNECTION PRESSURE INTEGRITY

(75) Inventors: Cooper C. Gill, Houston, TX (US); Carl S. Martin, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 185 days.

(21) Appl. No.: 12/974,802

(22) Filed: Dec. 21, 2010

(65) Prior Publication Data

US 2012/0153608 A1 Jun. 21, 2012

(51) Int. Cl.
*F16L 19/06* (2006.01)

(52) U.S. Cl.
USPC ............... 285/342; 285/353; 166/242.6

(58) Field of Classification Search
USPC ............ 285/342, 343, 353; 166/242.6, 242.7
See application file for complete search history.

(56) References Cited

U.S. PATENT DOCUMENTS

| | | | | |
|---|---|---|---|---|
| 433,489 A * | 8/1890 | Potts | | 285/343 |
| 1,893,181 A * | 1/1933 | Rumatz | | 285/343 |
| 1,978,547 A * | 10/1934 | McWane et al. | | 285/342 |
| 2,412,664 A * | 12/1946 | Wolfram et al. | | 285/343 |
| 2,453,024 A * | 11/1948 | Lomelino | | 285/343 |
| 2,478,149 A * | 8/1949 | Wolfram et al. | | 285/342 |
| 2,644,700 A * | 7/1953 | Woodling | | 285/343 |
| 3,233,920 A * | 2/1966 | Ammann | | 285/343 |
| 3,948,582 A * | 4/1976 | Martin | | 385/56 |
| 4,281,679 A * | 8/1981 | Stearns | | 285/342 |
| 4,529,230 A * | 7/1985 | Fatula, Jr. | | 285/343 |
| 4,616,900 A * | 10/1986 | Cairns | | 385/58 |
| 4,666,242 A * | 5/1987 | Cairns | | 385/75 |
| 4,682,848 A * | 7/1987 | Cairns et al. | | 385/69 |
| 4,690,437 A * | 9/1987 | Anderson, Jr. | | 285/343 |
| 4,976,142 A | 12/1990 | Perales | | |
| 5,033,808 A * | 7/1991 | Smith et al. | | 385/68 |
| 5,163,321 A | 11/1992 | Perales | | |
| 5,163,722 A * | 11/1992 | Worden | | 285/343 |
| 5,494,641 A * | 2/1996 | Krstanovic | | 285/342 |
| 5,954,375 A * | 9/1999 | Trickle et al. | | 285/342 |
| 5,961,160 A * | 10/1999 | Frohlich | | 285/342 |
| 6,102,449 A * | 8/2000 | Welsh | | 285/342 |
| 6,193,286 B1 * | 2/2001 | Jones et al. | | 285/343 |
| 6,241,022 B1 * | 6/2001 | Mailand et al. | | 285/342 |
| 6,494,500 B1 * | 12/2002 | Todosiev et al. | | 285/342 |
| 6,851,729 B2 * | 2/2005 | Gibson | | 285/342 |
| 7,228,898 B2 | 6/2007 | Grigsby et al. | | |
| 7,363,985 B2 * | 4/2008 | Heinonen et al. | | 166/242.6 |
| 7,509,000 B2 | 3/2009 | Coronado | | |
| 7,556,093 B2 | 7/2009 | Grigsby et al. | | |
| 7,628,543 B2 | 12/2009 | Coronado | | |

(Continued)

OTHER PUBLICATIONS

Swagelok "Gaugeable Tube Fittings and Adapter Fittings", www.swagelok.com; Replacement Parts, Ferrules; Swagelok Company; Mar. 2010; pp. 1-66.

(Continued)

*Primary Examiner* — David E Bochna
(74) *Attorney, Agent, or Firm* — Cantor Colburn LLP

(57) ABSTRACT

A wet disconnect system with post disconnection pressure integrity includes a bridge tube. One or more seals on the bridge tube that seal the bridge tube to one or more conductors passing through the bridge tube. A defeatable seal/anchor at the bridge tube sealing an outside surface of the bridge tube to an inside surface of a separate structure. The defeatable seal/anchor being defeatable upon application of an axial load above a threshold.

9 Claims, 3 Drawing Sheets

U.S. PATENT DOCUMENTS

| | | | |
|---|---|---|---|
| 7,681,926 B2 * | 3/2010 | Valaskovic et al. | 285/342 |
| 7,784,838 B2 * | 8/2010 | Levy | 285/342 |
| 7,806,443 B1 * | 10/2010 | Plattner | 285/342 |
| 7,975,772 B2 * | 7/2011 | Guven | 166/242.6 |
| 8,007,013 B2 * | 8/2011 | Arstein et al. | 285/342 |
| 8,037,933 B1 * | 10/2011 | Levy | 285/343 |
| 8,082,998 B2 * | 12/2011 | Richards | 166/242.6 |
| 8,176,612 B2 * | 5/2012 | Levy | 285/353 |
| 2005/0207708 A1 * | 9/2005 | Wittrisch | 385/55 |
| 2010/0092145 A1 | 4/2010 | Read | |

OTHER PUBLICATIONS

Bjornstad et al. "Fibre Optic Well Monitoring System," Offshore Europe, Sep. 3-6, 1991, Aberdeen, United Kingdom. [Abstract and Introduction Only].

Jenkins, Dave. "Underwater Mateable Connectors: Enabling Technology and the Next Step in Performance for Navy and Telecom Applications," Underwater Intervention Conference, 2002.

Shawly et al. "Successful Isolation of a Water Contribution Zone Using Fiber Optic Telemetry Enabled Coiled Tubing Conveyed Inflatable Packer Capped with Cement (Case Study)," SPE/DGS Saudi Arabia Section Technical Symposium and Exhibition, Apr. 4-7, 2010, Al-Khobar, Saudi Arabia. [Abstract and Introduction Only].

Tolan et al. "The Use of Fiber-Optic Distributed Temperature Sensing and Remote Hydraulically Operated Interval Control Valves for the Management of Water Production in the Douglas Field," SPE Annual Technical Conference and Exhibition, Sep. 30-Oct. 3, 2001, New Orleans, Louisiana. [Abstract and Introduction Only].

* cited by examiner

WET DISCONNECT SYSTEM WITH POST DISCONNECTION PRESSURE INTEGRITY

BACKGROUND

In the drilling and completion industry lines such as hydraulic lines are run into the downhole environment for many reasons, some of which include control and or monitoring of various downhole operations. In some cases the lines, such as capillary lines, are used to house sensors such as optic fiber sensors or communication lines, which may be wire conductors or optic fibers, for example. Such lines are sometimes placed upon permanent completion equipment where they are routed through packers or other sealing structures. As such they represent a potential leak path if severed uphole of the sealing structure.

One case in point is a situation where a "lower completion" is to be bejeweled with sensory equipment that will be communicatively connected to communication lines that are dependent from a workstring. As will be well understood to one of ordinary skill in the art, a workstring will be removed from the borehole prior to installing an upper completion. The communicative coupling between the sensory equipment in the lower completion must thus be severed. Severing a capillary line presents a possible leak path through sealing devices appurtenant the lower completion and accordingly in some applications is contraindicated. The art would well receive configurations capable of allowing severance of the connection without presenting a leak path.

SUMMARY

A wet disconnect system with post disconnection pressure integrity includes a fixed connector; a release connector having a defeatable seal/anchor; and a bridge tube received in each of the fixed connector and release connector, the bridge tube including one or more seals sealed with one or more conductors passing through the bridge tube, the bridge tube sealed and maintained in place until the defeatable seal/anchor is defeated.

A wet disconnect system with post disconnection pressure integrity includes a bridge tube; one or more seals on the bridge tube that seal the bridge tube to one or more conductors passing through the bridge tube; and a defeatable seal/anchor at the bridge tube sealing an outside surface of the bridge tube to an inside surface of a separate structure, the defeatable seal/anchor being defeatable upon application of an axial load above a threshold.

A wet disconnect system with post disconnection pressure integrity includes a bridge tube; one or more seals on the bridge tube that seal the bridge tube to one or more conductors passing through the bridge tube; and a mechanical release arrangement at the bridge tube anchoring the bridge tube to an inside surface of a separate structure, the mechanical release arrangement being releasable upon application of an axial load above a threshold.

A defeatable seal/anchor for a wet disconnect system with post disconnection pressure integrity includes a first portion having an antifrustoconical surface; and a second portion having a frusto conical surface configured to interact in use with the antifrustoconical surface, and an inside surface having material removed therefrom to adjust shear resistance of the second portion.

BRIEF DESCRIPTION OF DRAWINGS

Referring now to the drawings wherein like elements are numbered alike in the several Figures.

DETAILED DESCRIPTION

Figure 1:
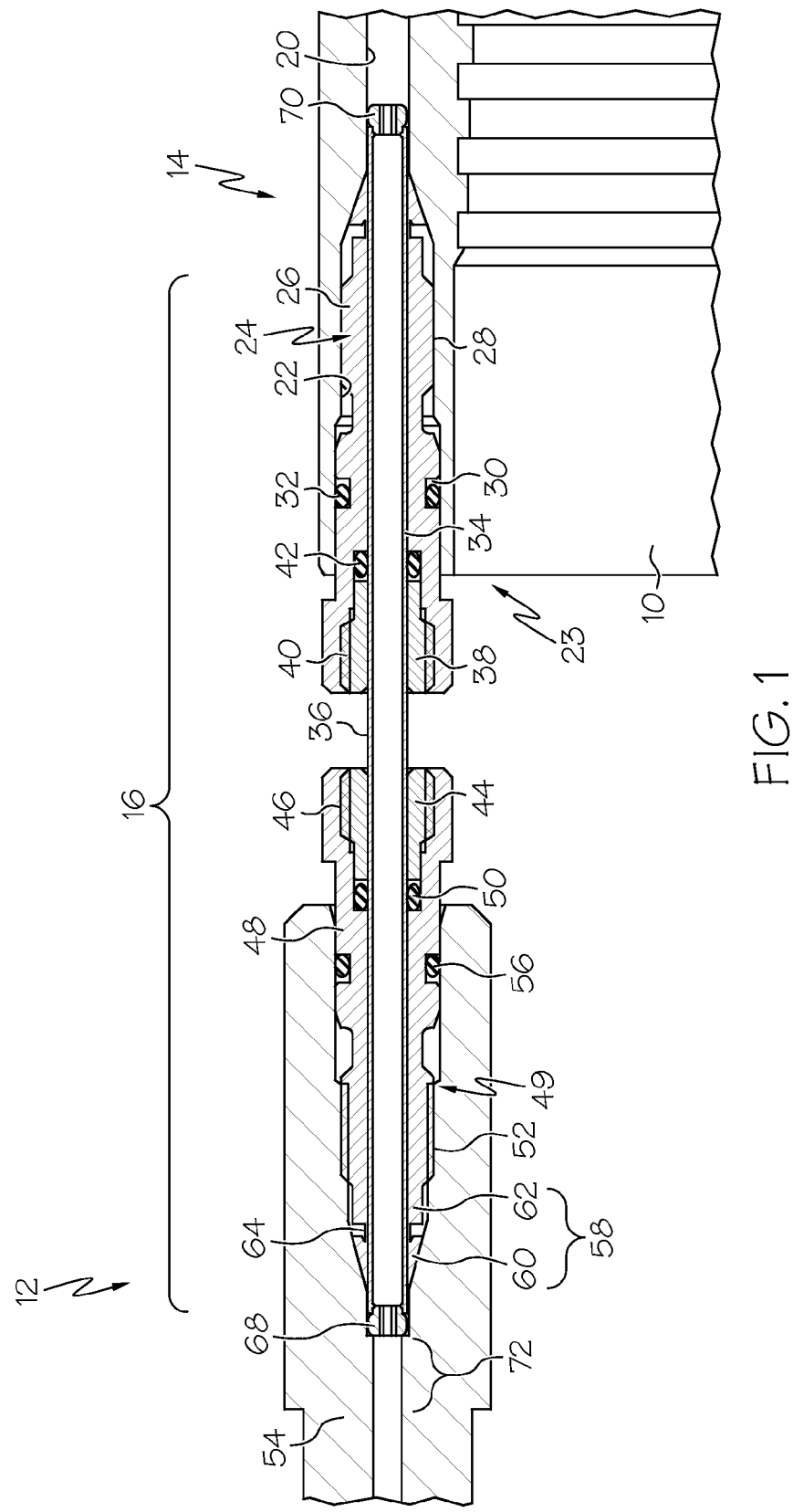
FIG. 1 is a cross sectional view of one embodiment of the wet disconnect system with post disconnection pressure integrity as disclosed herein.

Referring to FIG. 1, environment is elucidated by an uphole end 10 of a lower completion not otherwise shown. A workstring or service tool is omitted from the Figures as it is not a part of the invention but it will be understood that the uphole portion 12 of a line would be likely run in and out with a workstring or service tool. Upon the eventual pulling of the workstring or service tool, the uphole portion 12 of the line will be separated from a downhole portion 14 of the line. The whole completed line is identified for clarity with numeral 16 and includes the wet disconnect system with post disconnection pressure integrity.

It is to be appreciated that the wet disconnect system with post disconnection pressure integrity as disclosed herein is effective for all types of communication lines/conductors, for example but not limited to fiber optic lines, electric lines, etc. As each are used in the downhole environment the embodiments described below will refer to a conductor generically and is to be understood to comprise one or more conductors that are of the same type or different types where two or more are proposed for an application.

End 10 of the lower completion is provided with a passageway 20 therein to pass the conductor therethrough. Downhole of this structure there may be additional capillary line or other configurations not germane to this application. In the embodiment illustrated in FIG. 1, the end 10 further provides an enlarged bore 22 coaxially formed with the passageway 20 providing receptiveness for a fixed connector 23 including a jam nut 24. Such jam nut 24 is a commercially available component available from many sources such as Swagelok® under product category "Ferrules". The nut comprises a body 26 having a thread interface 28 to secure the body 26 to a surface of the enlarged bore 22. Further is provided a seal configuration illustrated as a groove 30 and O-ring 32. The jam nut 24 includes a bore 34 running therethrough to sealingly accept a bridge tube 36. It will be appreciated that the bridge tube 36 is secured in the body 26 by another smaller jam nut 38 (a part of the overall fixed connector) threadedly connected to the jam nut 24 by thread 40. A seal 42, which may be an o-ring, for example, seals the bridge tube 36 to the body 26. Jam nut 38 is also commercially available from Swagelok® and other sources.

Spaced along the bridge tube 36 from the fixed connector 23 is another smaller jam nut 44 threadedly attached to a separation jam nut 48 through thread 46. Together these jam nuts are a part of a release connector 49. A seal 50 such as an o-ring seals the bridge tube 36 to the nut 48. The nut 48 is threadedly attached at thread 52 to a removable structure 54 that may be a portion of the workstring or service tool or may simply be a part of the overall line. The jam nut 48 is sealed to the structure 54 by seal 56, which may be such as an o-ring.

At an uphole end of the jam nut 48 is positioned a defeatable seal/anchor 58 embodied in this embodiment as a ferrule. In one embodiment the releasable ferrule comprises two parts, 60 and 62. Each of these parts have a function as a ferrule but they also work together in that the portion 62 is configured to be urged in an axial direction so that an axial protrusion 64 thereof is somewhat positioned radially inwardly of portion 60 (see FIG. 2), which increases the total radial load on the system. The ferrule portions 60 and 62 (arbitrarily termed first and second, respectively) provide a metal to metal seal against the bridge tube 36 and the structure 54 but also allow sliding disengagement of the bridge tube 36 under a selected threshold axial load, which in one embodiment is a tensile load placed thereon by a withdrawal of the structure 54 from the borehole. The sliding disengagement allows for all of structure 54, releasable ferrule 58, jam nut 48, jam nut 44 and the seals to be retrieved uphole while leaving the bridge tube 36 connected to the more downhole components not indicated as being withdrawn uphole.

It is to be noted that the bridge tube 36 includes at one end at least, and in this embodiment at both ends thereof, seals 68 and 70, which provide a hydraulic seal between a conductor running through the bridge tube 36 and the tube 36 itself. The conductor may in some embodiments be an optic fiber. The seals 68 and 70 are fixed position components and do not move when the system is placed under tension by retrieval of the workstring or service tool. Hence, it will be appreciated that upon movement of the retrieved components noted a tensile strain is placed on the conductor at zone 72 and will result in a separation of the conductor at that location upon retrieval of the workstring or service tool. What is left downhole is the bridge tube 36 with its end sealed at seal 68 so that no hydraulic pathway exists through a lumen of the capillary tube that might otherwise create a leak path through sealing structures further downhole.

Figure 2:
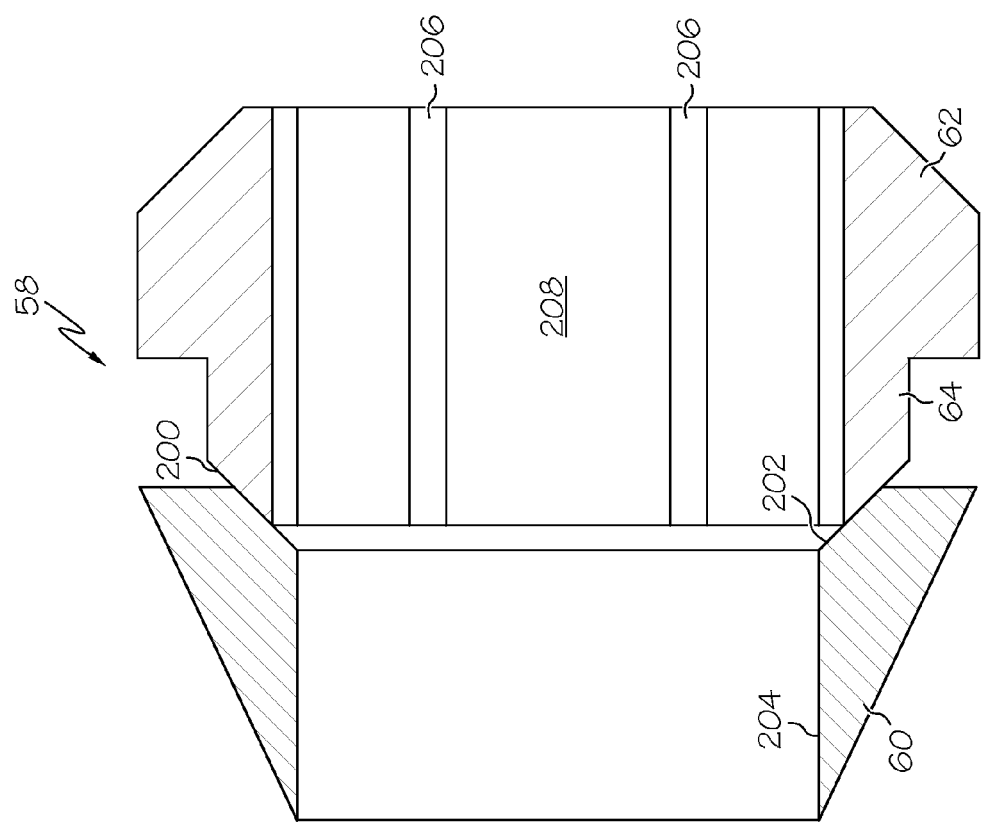
FIG. 2 is an enlarged view defeatable seal/anchor.

To ensure a proper understanding of the defeatable seal/anchor, reference is made to FIG. 2; the defeatable seal/anchor is illustrated in an enlarged view to make clearer its nature. 200 series numerals are used in the description of this Figure other than the use of numerals from FIG. 1 where applicable. Further to the notation above, the axial protrusion 64 presents a frustoconical surface 200 at an end thereof. The surface 200 is configured to interact with an inner surface 202, having a frustoconical shape, of portion 60. Upon axial compression of the portion 62 into the portion 60, a radially directed force in both directions is produced to assist the function of the ferrule, i.e. to releasably anchor the tube 36 as noted above. It is further to be appreciated that the portion 60 is provided with an inside surface 204 having a dimension that is known to be properly interactive with the exterior diameter of a tube 36 as selected. One of ordinary skill in the art is well versed in selecting a ferrule portion of this type having the appropriate inside dimension. This portion 60 will hold, as does any ferrule portion onto the tube 36. In order to enable the function of the device as described, the portion 62 is unusual in that it is provided with a series of surface gaps 206, on an inside surface 208 of portion 62, that are, in this embodiment, illustrated as grooves. It is to be understood that the issue is one of surface area so that grooves are not the only configuration that is possible. Rather any removal of material at the inside surface 208 of the portion 62 that reduces the surface area in contact with the tube 36 will reduce the ultimate holding capability of the portion 62 against the tube in shear. In the illustrated embodiment, the grooves 206 will be variable in number, width and length to, at the time of manufacture, to select the actual shear resistance. Determining the exact amount of shear produced is by iteration so that the ferrules are made in batches to have the same properties. The selected properties are those that provide sufficient holding power for the tube 36 to maintain its position for run in and use and then allow the releasable seal/anchor 58 to release upon a pull of a predetermined value.

Figure 3:
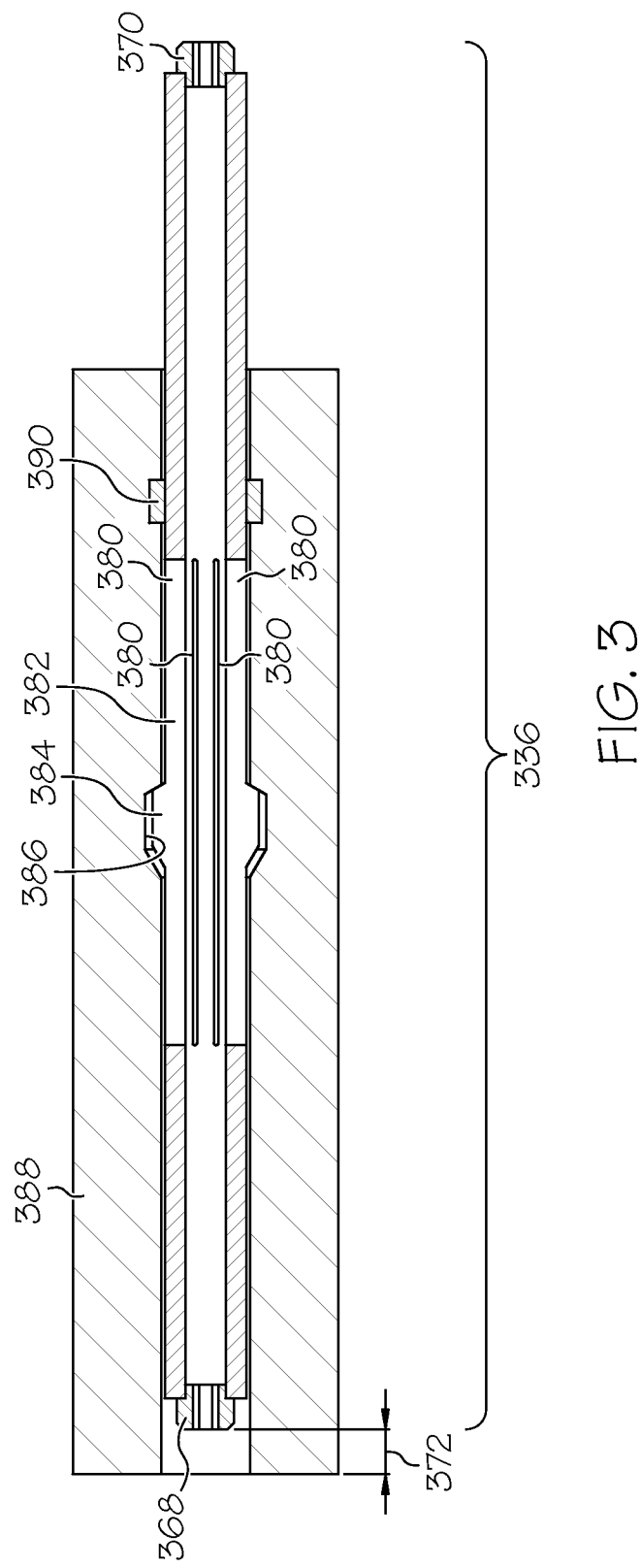
FIG. 3 is a cross sectional view of another embodiment of the wet disconnect system with post disconnection pressure integrity as disclosed herein.

In another embodiment hereof, and referring to FIG. 3, the portions of the FIG. 1 embodiment that are removed uphole upon retrieval are replaced with the construction illustrated. It is to be appreciated that the downhole end (right side) of the illustration of FIG. 3 will be configured with the bridge tube shown within all of the other components discussed in FIG. 1. These have been omitted here for simplicity of discussion and clarity of the different embodiment.

In the embodiment of FIG. 3, the bridge tube carries numeral 336 as it has a different structure from that of bridge tube 36. Tube 336 is configured as a mechanical release arrangement such as a collet as well as a bridge tube. As such, the tube is of a somewhat heavier gauge material the gauge being selected to have resilience desired for a particular application. As will be understood, the thicker the material the higher the resilience. The tube is slotted at a number of places around a periphery thereof. Several slots are visible with numeral 380. Each two slots defines a finger 382 that is capable of deflecting radially inwardly upon a sufficient radially acting compressive force. One or more of the fingers 382 includes a profile 384 thereon. The profile(s) are configured to allow a relatively easy snap-in and a relatively harder snap out in this particular embodiment however it is to be appreciated that the same force threshold could be used or even thresholds that are easier snapping out than in. The profile(s) are configured to be received in a recess 386 of a removable structure 388. The recess 386 prevents unintended release of the bridge tube 336 from the structure 388 until a tensile load associated with withdrawal of the workstring or service tool is placed upon the system. The threshold for release may be easily adjusted to the needed amount in known ways at the manufacturing stage. Upon release, the conductor, (whatever type that may be) will be severed at the zone 372 leaving a seal 368 or 370 in place as in the former embodiment. Finally it is noted that a seal 390 is positioned to seal the bridge tube 336 to the structure 388.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A wet disconnect system with post disconnection pressure integrity comprising:
   a fixed connector;
   a release connector having a defeatable seal/anchor including a first portion having an inner surface with a frustoconical shape, and a second portion having a frustoconical surface configured to interact in use with the inner surface of the first portion, and an inside surface having material removed therefrom to adjust shear resistance of the second portion; and
   a bridge tube received in each of the fixed connector and release connector, the bridge tube including one or more seals sealed with one or more conductors passing through the bridge tube, the bridge tube sealed and maintained in place until the defeatable seal/anchor is defeated.

2. A wet disconnect system with post disconnection pressure integrity as claimed in claim 1 wherein the seal/anchor allows the bridge tube to slide therethrough upon a tensile load above a threshold load.

3. A wet disconnect system with post disconnection pressure integrity as claimed in claim 1 wherein the fixed connector comprises a jam nut.

4. A wet disconnect system with post disconnection pressure integrity as claimed in claim 1 wherein the release connector comprises a jam nut.

5. A wet disconnect system with post disconnection pressure integrity as claimed in claim 1 wherein the defeatable seal/anchor is a ferrule.

6. A wet disconnect system with post disconnection pressure integrity as claimed in claim 5 wherein the ferrule comprises the first and second portions.

7. A wet disconnect system with post disconnection pressure integrity as claimed in claim 6 wherein the second portion is forced radially inwardly of the first portion upon axial compression of the first and second portions during setting of the ferrule.

8. A wet disconnect system with post disconnection pressure integrity comprising:
   a bridge tube;
   one or more seals on the bridge tube that seal the bridge tube to one or more conductors passing through the bridge tube; and
   a defeatable seal/anchor at the bridge tube sealing an outside surface of the bridge tube to an inside surface of a separate structure, the defeatable seal/anchor being defeatable upon application of an axial load above a threshold, the defeatable seal/anchor including a first portion having an inner surface with a frustoconical shape, and a second portion having a frustoconical surface configured to interact in use with the inner surface of the first portion, and an inside surface having material removed therefrom to adjust shear resistance of the second portion.

9. A wet disconnect system with post disconnection pressure integrity as claimed in claim 8 wherein the axial load is a tensile load.

\* \* \* \* \*

UNITED STATES PATENT AND TRADEMARK OFFICE
Certificate

Patent No. 8,459,700 B2                                                          Patented: June 11, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Cooper C. Gill, Houston, TX (US); Carl S. Martin, Houston, TX (US); and Carl W. Stoesz, Blacksburg, VA (US).

Signed and Sealed this Thirteenth Day of May 2014.

*DANIEL P. STODOLA*
*Supervisory Patent Examiner*
*Art Unit 3679*
*Technology Center 3600*